United States Patent [19]
Thivet

[11] Patent Number: 5,932,126
[45] Date of Patent: Aug. 3, 1999

[54] CIGARETTE LIGHTER BODY WITH TWO BIMETAL MEMBERS MOUNTED HEAD TO TAIL

[75] Inventor: Gilles Thivet, Labruguiere, France

[73] Assignee: Valeo Vision, Bobigny Cedex, France

[21] Appl. No.: 08/649,723

[22] PCT Filed: Dec. 13, 1995

[86] PCT No.: PCT/FR95/01656

§ 371 Date: Nov. 19, 1996

§ 102(e) Date: Nov. 19, 1996

[87] PCT Pub. No.: WO96/18522

PCT Pub. Date: Jun. 20, 1996

[30] Foreign Application Priority Data

Dec. 13, 1994 [FR] France .................................. 94/15103

[51] Int. Cl.[6] .......................................................... B60N 3/14
[52] U.S. Cl. .......................................................... 219/265
[58] Field of Search .................................... 219/265, 270, 219/267; 361/264–266; 123/145 A

[56] References Cited

U.S. PATENT DOCUMENTS

| 3,439,148 | 4/1969 | Horwitt .................................... 219/265 |
| 3,532,849 | 10/1970 | Horwitt .................................... 219/265 |
| 3,863,047 | 1/1975 | Mase . |
| 4,016,400 | 4/1977 | Seibel et al. . |
| 5,233,162 | 8/1993 | Gaisberg et al. ........................ 219/265 |
| 5,493,098 | 2/1996 | Diederich ................................ 219/265 |

FOREIGN PATENT DOCUMENTS

| 492 042 | 6/1991 | European Pat. Off. . |
| 436 865 | 7/1991 | European Pat. Off. . |
| 2 272 343 | 12/1975 | France . |
| 57-202429 | 12/1982 | Japan .................................... 219/265 |

*Primary Examiner*—John A. Jeffery
*Attorney, Agent, or Firm*—Morgan & Finnegan, LLP

[57] ABSTRACT

The lighter body comprises a lighter, a connecting bimetallic strip and a safety bimetallic strip mounted head to tail in relation to the connecting bimetallic strip and having two safety blade able to cooperate with convex contact parts belonging to a power supply part.

8 Claims, 3 Drawing Sheets

CIGARETTE LIGHTER BODY WITH TWO BIMETAL MEMBERS MOUNTED HEAD TO TAIL

FIELD OF THE INVENTION

The present invention relates to a cigar lighter, particularly, for a motor vehicle.

More particular, it relates to the lighter body of such a cigar lighter.

BACKGROUND OF THE INVENTION

As is known, the lighter body serves as a receptacle for a removable heating plug equipped with a heating body to light the cigar or the cigarette and comprises an electrically conductive lighter socket, with a bottom, internally bearing with electrical insulation provided, by means of an attachment device and a first electrically insulating part, a connection member usually in the form of a bimetallic strip with a base and axially oriented blades originating from the said bottom and directed towards the open end of the lighter socket.

More precisely the plug has a cup surrounding the heating body and the blades of the connecting bimetallic strip each have a hook-shaped free end, so that a clip is formed which is able to cooperate with the cup of the plug to keep it in the heating position and to establish an electric circuit by means of power supply parts borne by the lighter socket and connected to the terminals of the voltage source, namely the battery in the case of an application to a motor vehicle.

When the heating body reaches a sufficiently high temperature, the blades of the connecting bimetallic strip expand to interrupt the circuit.

In certain cases, these blades may accidentally remain in contact with the cup although the heating body has reached the required temperature.

This may be a cause of fire due to the fact that the fixed wall on which the lighter body is mounted is usually made of plastic material.

For this reason a safety element which consists of a blade forming a bimetallic contactor forming an integral part of the connecting bimetallic strip was specified in document FR-A-2 655 927.

This blade extends axially in the opposite direction to the blades of the bimetallic strip and for this purpose passes through the bottom of the lighter socket by means of an opening.

This blade is able to come into contact with a plane portion belonging to the power supply part connected to the terminal of the battery to establish a complete short circuit thus causing a large increase in the electric current, which immediately blows the fuses protecting the cigar lighter and prevents the fact that the heating plug is kept in the heating position from producing a fire.

This arrangement makes it not necessary to increase the axial length of the lighter socket and this safety blade is sensitive to the temperature of the connecting bimetallic strip so that it may be traversed by a large heat flow in contrast to the arrangement described in document DE-A-1 950 758 in which the safety blade is mounted outside the lighter socket to come into contact with a metallic attachment shell surrounding this socket by being fixed thereto by screwing.

This blade is then insulated in relation to the socket and is sensitive to the temperature of the connector member via the attachment device so that the heat flow is not very large.

In practice in document FR-A-2 655 927 this safety blade bears a contact stud able to cooperate with a plane portion belonging to the power supply part connected to the negative terminal of the battery.

This part, hereinafter called the second power supply part, is disposed outside the lighter socket whilst being connected electrically to the bottom thereof, whereas the other power supply part, hereinafter called the first power supply part, is connected to the connecting bimetallic strip via the attachment device with the intervention of a second electrically insulating part inserted between the said power supply parts.

SUMMARY OF THE INVENTION

As a result this arrangement having a contact stud is relatively expensive.

The object of present invention is to remove this drawback and thus to create, in a simple and economical manner, a safety device devoid of a contact stud.

According to the invention a lighter body of the above-mentioned type is characterised in that the safety blade is separate from the connecting bimetallic strip whilst being adjacent to the base of the bimetallic strip, and in that this safety blade is able to cooperate at its free end with a convex part belonging to the second power supply part so that the safety blade is devoid of a contact stud.

As a result of the invention it is not necessary to provide a contact stud on the safety blade and during operation any welding of the safety blade onto its associated contact part belonging to the second power supply part is avoided.

This is achieved thanks to the convex shape of the contact part avoiding too large current density during the establishment and the breaking of the safety contact.

It will be noted that, due to the fact that the safety blade is separate from the connecting bimetallic strip, its material can be chosen in an adequate manner and its thickness can be determined in order to have a complete short circuit.

Thus, a better result is obtained than when this blade, consists of a single piece with the connecting bimetallic strip.

The safety element can only have one safety blade but this blade advantageously belongs to a safety bimetallic strip comprising two axially oriented safety blades, the safety bimetallic strip being mounted head to tail in relation to the connecting bimetallic strip.

Thus the operation of the safety device is further improved due to the fact that it comprises two safety blades, each capable of cooperating with a convex part belonging to the second power supply part.

For this purpose, these convex parts are advantageously supported by the second electrically insulating part provided with through passages, one of the edges of which has a complementary shape to the shape of the convex parts to support them.

This second electrically insulating part advantageously masks the safety blades.

The free end of the safety blades preferably has a V-shaped section to further reduce the risks of the blades sticking on their respective convex contact part.

In an embodiment, the lighter socket bears an additional contact part assembled on the contact of the base of the connecting bimetallic strip by means of the attachment device. This part is axially displaced towards the bottom of the lighter socket in relation to the hooks of the blades of the connecting bimetallic strip.

Thus, when the plug accidentally remains inserted without the blades of the connecting bimetallic strip remaining stuck on the cup of the heating plug, it is possible at the end of a determined time to make the blades of the safety bimetallic strip act to establish a complete short circuit and to prevent the battery running down whilst sparing the blades of the connecting bimetallic strip.

BRIEF DESCRIPTION OF THE DRAWINGS

The following description illustrates the invention, for an understanding of which reference is made to the attached drawings in which.

DETAILED DESCRIPTION OF THE INVENTION

In these figures a cigar lighter for a motor vehicle is represented, which comprises a removable heating plug 30 and a lighter body 40 forming a receptacle and connector for the plug 30.

Figure 1:
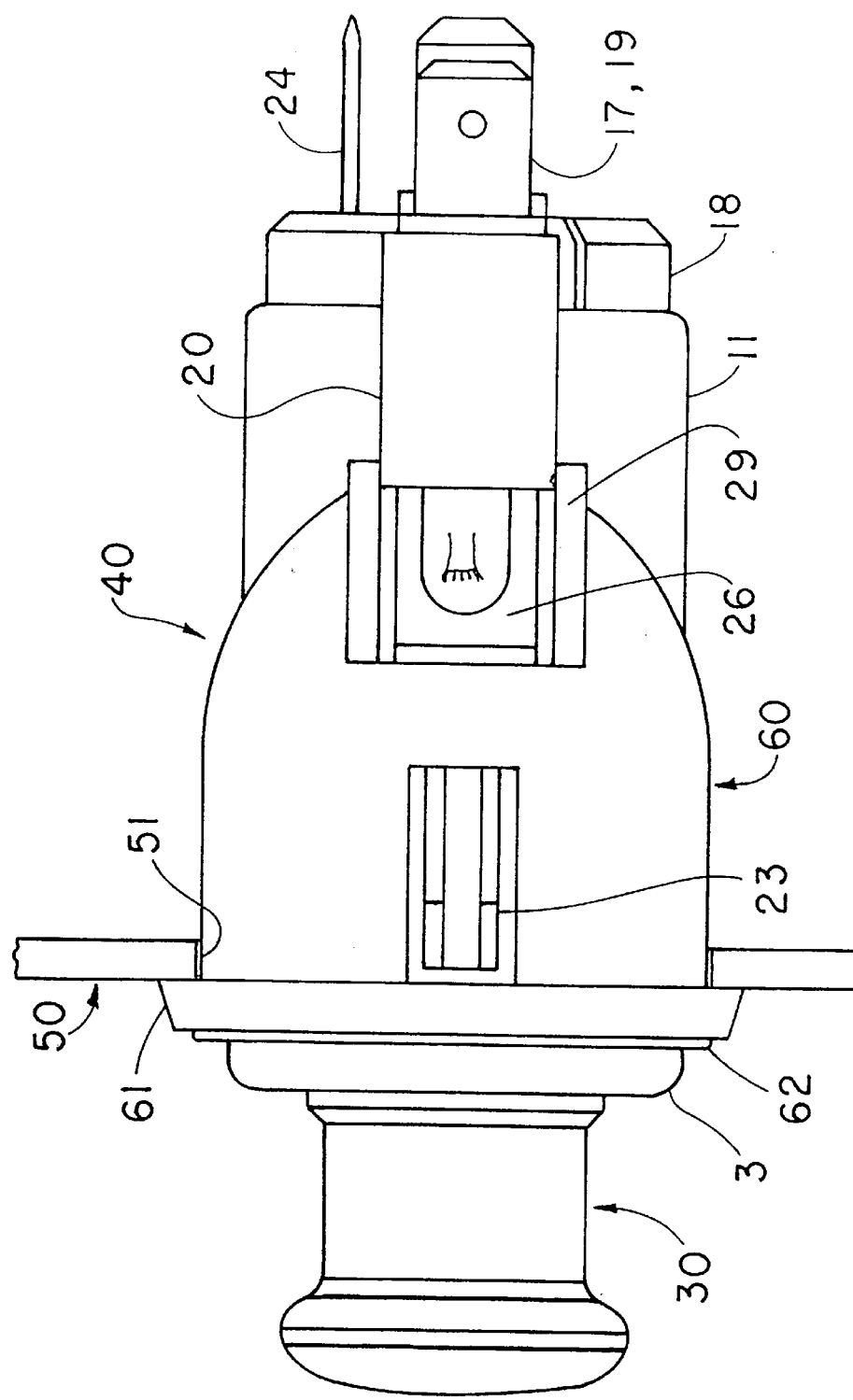
FIG. 1 is a view of a cigar lighter mounted on the fixed wall of a motor vehicle, in accordance with the invention.
Figure 2:
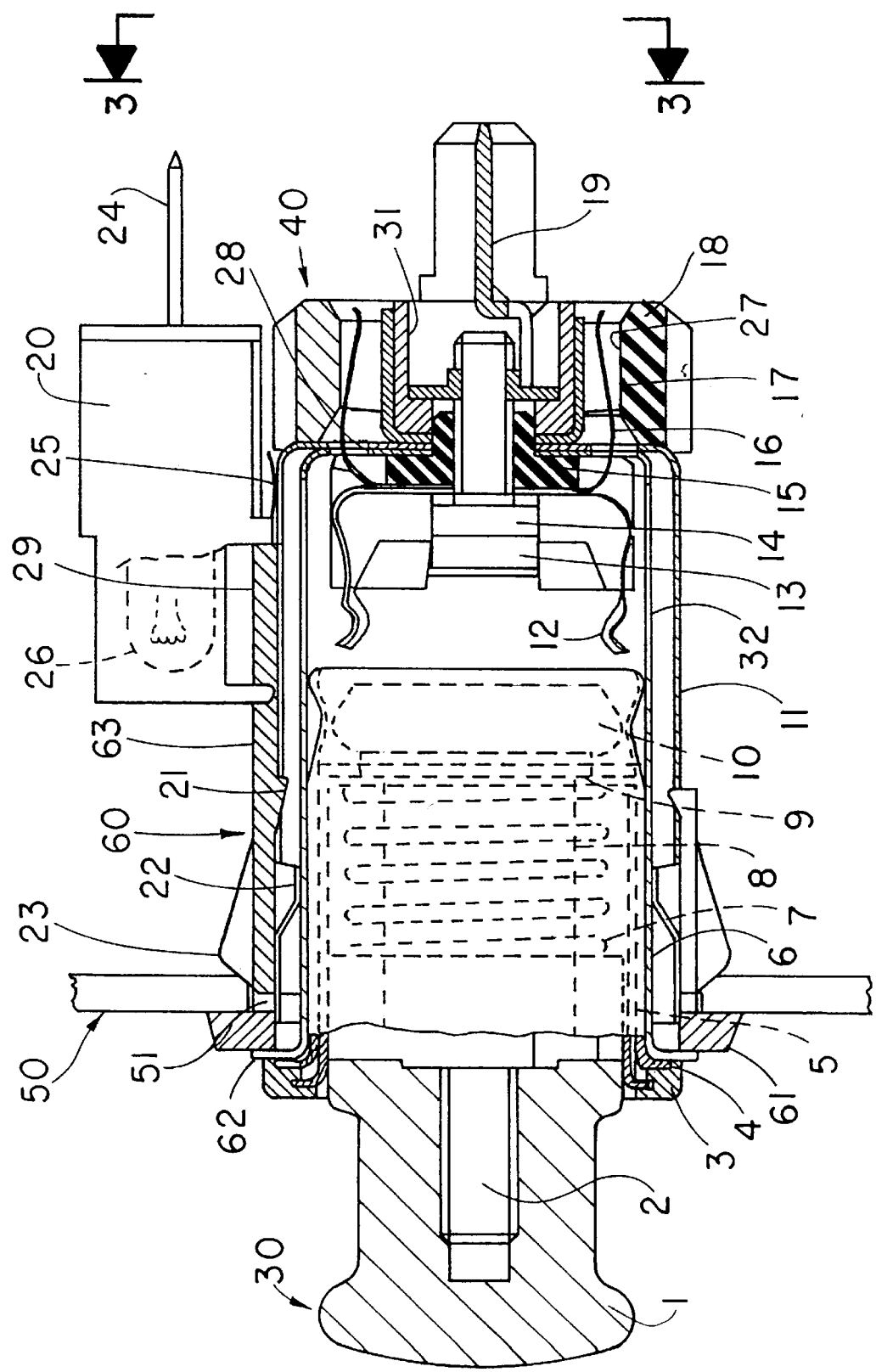
FIG. 2 is a similar axial sectional view corresponding to embodiment of FIG. 1.

Referring to FIG. 2, the lighter body 40 has an electrically conductive lighter socket 6, closed at the rear by a bottom, an attachment device 14 passing through the bottom, a connection device 12 mounted inside the socket 6 and connected electrically by the attachment device 14 to a first power supply part 19 mounted on the outside of the socket 6, a first electrically insulating part 15 placed between the connection device 12 and the bottom of the socket 6, a second power supply 17 mounted on the outside of the socket 6 whilst being adjacent to the bottom thereof and electrically connected to the said socket 6, a second electrically insulating part 18 placed between the first 19 and the second 17 power supply parts, a safety element 16 having a generally axially oriented safety blade, capable of establishing a short circuit in the event of the overheating of the lighter body 40, the attachment device 14 passing though the electrically insulating parts 15, 18 for the assembly of the power supply parts 19, 17 of the connection device 12, and of the safety element 16.

The parts 6, 12, 14, 16, 17, 19, here metallic, are therefore electrically conductive, whereas the parts 15, 18 are electrically insulating, as they are advantageously made from mouldable plastic material.

More precisely, the attachment device 14 consists of a metallic screw, or alternate rivet, the connection device 12 is a bimetallic strip, the parts 17, 19 consist of generally axially oriented blades, on a base of copper, and the safety element 16 is a bimetallic strip mounted head to tail in relation to the bimetallic strip 12 whilst being separate therefrom.

These bimetallic strips 12, 16 have a generally U-shaped section with a disc-shaped base and two generally diametrally opposite and axially oriented blades.

The discs of the bimetallic strips 12, 16 are in contact with one another, the blades of the bimetallic strip 16 passing through the bottom of the socket 6 by means of openings 28, whereas the cylindrical socket 6, here made of deep-drawn sheet, has, opposite the blades of the connecting bimetallic strip 12, two clearance openings 32, which are diametrally opposite and each also delimiting a lug 33 (FIG. 4) for the retention of the plug 30 in the waiting position.

The first insulating part 15 forms an axial spacer placed between the base of the bimetallic strip 16 and the bottom of the socket 6.

The second insulating part 18 generally has the shape of a solid washer equipped with a central through-opening 31 for the passage of the screw 14 and of two lateral through-openings 27 for, firstly, mounting two axially oriented contact parts 37, which here in accordance with the invention are curved convexly (FIG. 3), of the second blade 17, and, secondly, the loose housing of the blades of the bimetallic strip 16, the free ends of which have a generally V-shaped section (FIG. 2) for localized contact with the convex contact parts 37, here rounded in an arc shape, of the blade 17.

The opening 31 is stepped for the definition of a shoulder. It is on this shoulder that the base of the right-angled blade 19 bears. This base, parallel to the bottom of the socket 6, is centrally provided with a hole with the formation of a threaded shaft for screwing the end of the screw 14.

The blade 17 also generally is shaped as a right angle with a base, forming an attachment end, parallel to that of the blade 19 and to the bottom of the socket 6. The insulating washer 18 therefore forms an axial spacer between the bases of the blades 17, 19 by means of a bottom delimited by the stepped opening 31.

The washer 18 also has (FIG. 3), perpendicular to the openings 27, an opening for the passage in a complementary manner of the axial part of the blade 17.

The opening 31 also delimits two diametrally opposite grooves for mounting the axial part, provided with a bend (FIG. 2), of the blade 19 in the manner of a drawer, which blade thus extends perpendicularly in relation to the blade 17.

These blades 17, 19 are immobilized and positioned (by mating engagement) by the washer 18 and protrude axially in relation thereto in the direction opposite to the bottom of the lighter socket 6. These blades 17, 19 are provided with shoulders on the outside of the washer 18.

The washer 18 therefore also forms a spacer in the transversal direction, of FIG. 2 between the blades 17, 19.

The blades of the safety bimetallic strip 16 and the associated arc-shaped contact parts 37 of the blade 17 are masked by the washer 18 (FIG. 2) and therefore do not protrude axially in relation to this washer 18.

Figure 3:
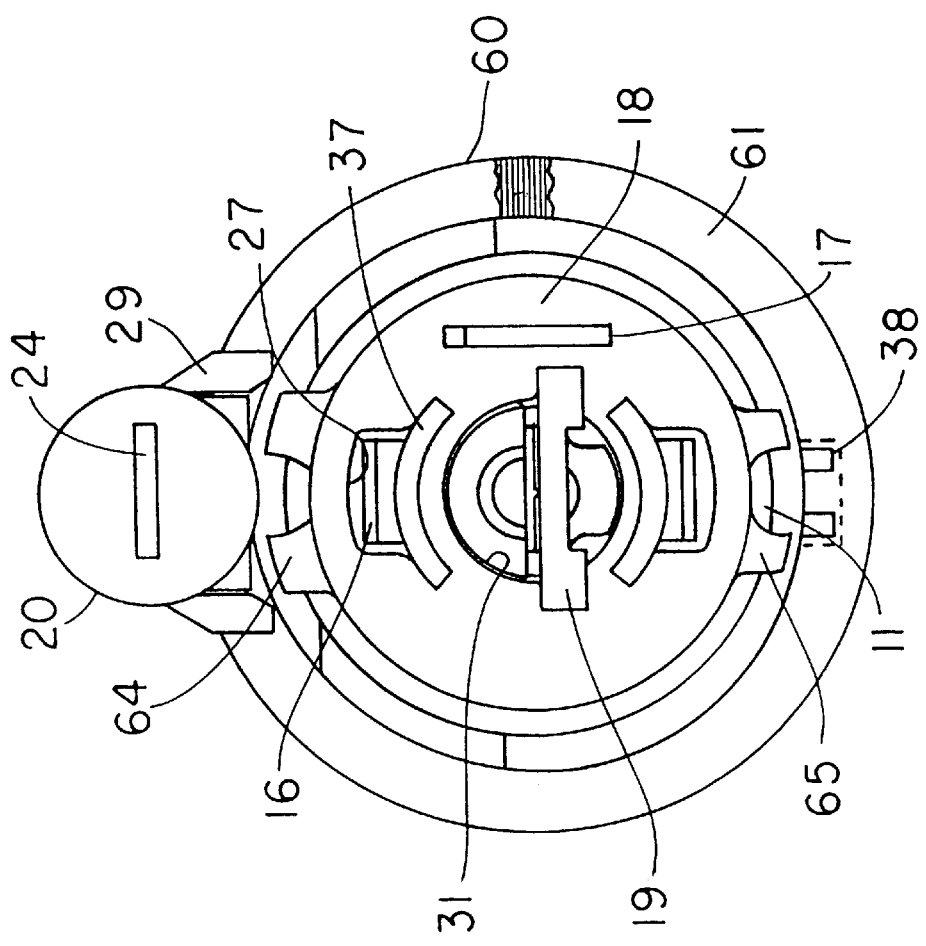
FIG. 3 is a view along arrow 3 of FIG. 1 without the fixed wall.

At its base each opening 27 also has two arc-shaped grooves (FIG. 3) for mounting parts 37 by sliding in the manner of a drawer. These parts 37 originate from the base of the blade 17 and extend axially towards the outside so that the attachment end of the blade 17 generally has a U-shaped section with two arms 37 in an arc. These diametrally opposite parts 37 are in contact with the corresponding lower arc-shaped edge of the opening 27 (FIG. 3). This lower edge thus forms a support for the contact parts.

Each opening 27 thus has (FIGS. 2 and 3) an axially oriented upper edge, chamfered at each of its ends, two parallel lateral edges, generally perpendicular to the upper edge, and an axially oriented lower edge in the shape of an arc of a circle delimited laterally by the grooves for mounting the parts 37, the grooves touching the lateral edges. In normal operation, the blades of the bimetallic strip 16 are each at a distance from the lateral and upper edges of the opening 27, and also from the part 37 in question.

It will be appreciated that the chamfers of the upper edges enable, during normal operation, any contact to be avoided between, firstly, the rounded connecting zone of the blade of the bimetallic strip 16 at its base and the upper edge of the opening 27 and, secondly, between this upper edge and the V-shaped end of the said blade.

According to a characteristic the base of the blade 17 is in direct contact with the bottom of a masking socket 11 surrounding the lighter socket 6 to mask its openings 32.

Thus no wire or cable can touch the blades of the connecting bimetallic strip 12, which may expand through the openings, bearing in mind that in a motor vehicle the cigar lighter is installed in a region, for example at the level of the dashboard, where a number of electric cables and wires pass. Thus there is no risk of damaging the wires or cables, of blowing the fuses and/or of causing a fire.

The rear bottom of the electrically conductive masking socket 11, which is cylindrical and made from deep-drawn sheet, is in contact with the bottom of the lighter socket 6 and the screw 14 passes, with electrical insulation provided, through the bottoms provided with holes for this purpose.

The insulating part 15, mounted for the most part in the socket 6, has a central nose passing through the central openings of the bottoms of the sockets 6, 11, the base of the blade 17 provided centrally with a hole for this purpose, to penetrate into the portion of reduced diameter of the opening 31 of the washer 18.

This central nose is traversed by the screw 14, which allows a clamping assembly of the parts 12, 15, 16, 11, 6, 17, 18 and 19 between them.

The outer periphery of this nose has at least one flat portion cooperating with flat portions having a complementary shape made in the coinciding openings of the sockets 6, 11 and of the washer 18 and the blades 17 and 19 being further immobilized by the washer in the above-mentioned manner. Thus a rotational locking, by mating engagement, of the parts 15, 16, 6, 11, 17, 18, 19 is achieved with the clamping of said parts on either side of the bottoms of the sockets 11, 6 via the screw.

As a variant, the nose of the insulating part 15 may have a polygonal shape, for example a square shape and the same applies to the above-mentioned complementary openings.

As a variant these openings and the nose of the part 15 may have a cylindrical shape, the part 15 laterally having at least one cylindrical point passing in a complementary manner through the bottoms of the sockets 6, 11 and of the washer 18.

This point therefore also passes through the base of the blade 17 in a complementary or non-complementary manner.

For example, the point passes through oblong openings made in the sockets 6, 9, the width of the openings being equal to the diameter of the point, which penetrates into a U-shaped notch with a rounded bottom, made in the lateral edge of the blade 17 affixed to that edge associated with the axial part of the blade.

The radius of the bottom of the U of the notch is equal to that of the point except for the mounting clearance. Thus, an indexing and a rotational locking of the socket 11 is produced.

Of course, the washer 18 is notched at the level of the point.

The insulating part 15, thermally insulating, also allows the bimetallic strips 12, 16 to be positioned loosely and to make the shape of a goblet with an axially oriented skirt directed towards the open end of the socket 6 and a notched bottom for the passage of the blades of the bimetallic strips 16 each passing loosely through a passage 28 formed by coinciding openings made in the bottoms of the sockets 6, 11.

The nose of the part 15 therefore extends axially in the opposite direction of the locally notched skirt for the passage of the blades of the bimetallic strip 12 and in correspondence with the openings 32. The skirt of the part 15 is also notched for the passage of at least one blade of an additional contact part 13 with the plug 30 when said plug is in the inserted position.

This part 13, which has a generally L-shaped section, has an annular base placed between the head of the screw 14 and the base of the connecting bimetallic strip 12.

The resiliently deformable blades of the bimetallic strip 12 each have a free hook-shaped end directed one towards the other so that a clip is formed which is able to cooperate with the cup 10 of the plug 30 to keep said plug in the heating position.

This electrically conductive cup 10 serves as a housing for a heating body, normally a heating resistor (not visible) described for example in document FR-A-2 457 787, to which reference may be made for further details. The heating plug 30 does not form part of the invention and will not be described in further detail here.

Figure 4:
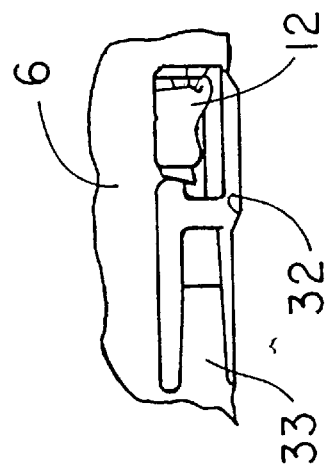
FIG. 4 is a partial view of the lighter socket showing one of these clearance openings.

As a reminder, it will be recalled that this plug 30 is able to occupy a waiting position, in which its ash-guard 4, surrounding the cup 10, comes into engagement by its profiled free end (FIG. 2) with the retention lugs 33 of the socket 6, which have a hook-shaped free end (FIG. 4).

The free end of the ash-guard 4 has a collar attached to a ring 3 made of plastic material also allowing, by moulding, the attachment of a collar belonging to a tube-guide 5 with the centrally pierced bottom to form shaft allowing the guidance of a support tube 8 integral with a core 2, made of electrically and thermally insulating material, having a threaded shank for its connection to a gripping knob 1 made of electrically insulating material. Here the parts 1, 2 are made of plastic material, like the ring 3, and belong with the tube 8 and the cup 10 to a part which can move axially in relation to a fixed part comprising the electrically conductive parts 4,5, connected to one another by the ring 3 the part 4 surrounding the part 5. These parts are movable in relation to one another in opposition to an electrically conductive coil spring 7 placed between the bottom of the tube-guide 5 and the dorsal face of the core 2 engaged by force in the tube 8. An electrically insulating washer 9 is placed axially between the bottom of the tube 8 and the bottom of the cup 10 assembled together by a rivet (not visible) as described in document FR-A-2 457 787.

The parts 4, 5, 8 are made from deep-drawn sheet.

When the occupant of the vehicle inserts the gripping knob 1, the cup 10 moves axially to separate the blades of the bimetallic strip 12 and come into engagement therewith. An electric circuit is then established to heat the heating resistor of the plug 30, bearing in mind that the blade 19 is normally connected to the positive terminal of the battery, whereas the blade 17 is connected to the negative terminal of the battery.

In this heating position of the plug 30, the electric current is established through the parts 19, 14, 12, 10, 8, 4, 5, 6 and 17 so that, for a determined temperature of the heating resistor of the plug 30, the blades of the bimetallic strip 12 move apart to free the cup 10, which returns to its initial position under the action of the spring 7. Then one only has to extract the plug 30 from the lugs 33 in order to light a cigarette, for example.

When, in the heating position of the plug 30, the blades of the bimetallic strip 12 accidentally remain in engagement with the cup 10, abnormal heating is produced, resulting in the bimetallic strip 16 establishing a complete short circuit by localized cooperation of the blades with the convex contact parts 37 of the earth blade 17, which causes an overload blowing the fuse of the cigar lighter, thus avoiding a risk of fire bearing in mind that the lighter body 40 is fixed to a fixed wall 50 of the vehicle, which is normally made of plastic material, just like the illuminant ring 60 with collar or end ring 61, which the lighter body here has in the manner described below.

The mounting and attachment wall 50 of the lighter body 40 may be the dashboard or console of the vehicle.

It will be appreciated that the V-shape of the end of the blades of the safety bimetallic strip 16, in combination with the parts 37, prevents any sticking of the blades on the parts 37.

An object may accidentally come into contact with the knob 1 and keep it in the inserted position without the occupant wishing to light a cigarette. This may be, for example, a case or an incorrectly wedged package keeping the knob 1 in the inserted position. In this case a heating of the heating resistor is produced with oscillating phenomena of the blades of the connecting bimetallic strip.

In fact, these blades move away from the cup 10 for a given temperature of the heating resistor of the plug 30, then come back into contact with the cup 10 as the knob 1 remains wedged due to the fact, for example, that the case prevents the cup 10 from moving away under the action of the spring 7.

To avoid this, in accordance with a characteristic, the cup 10 is allowed, when the knob 1 is inserted, to cooperate with the axial blade of the additional electrically conductive contact part 13. This part 13 is electrically connected to the terminal of the battery via the screw 14. Thus, another direct electric circuit is established independently of the oscillations of the bimetallic strip 12, the blades of which are allowed to come into contact with the cup 10 and to move away therefrom in the above-mentioned manner.

As the base of this part 13 is placed between the head of the screw 14 and the disc of the bimetallic strip 12, when the knob 1 remains accidentally inserted in the above mentioned manner, by heating, an intervention of the safety bimetallic strip 16 occurs, the blades of which contract to come into contact with the parts 37 of the blade 17. Then a complete short circuit is produced, which makes the safety fuse of the cigar lighter blow. Thus, the running down of the battery is prevented.

Of course the axial position of the contact part 13 is determined according to applications.

Generally this blade is axially set back in relation to the hooks of the bimetallic strip 12 and also has a deformed free end for localized contact with the cup 10 of the plug 30.

It will be noted that the nature of the material of the bimetallic safety strip 16 and also its thickness depend on the applications, the bimetallic strip being made from a material which differs from that of the connecting bimetallic strip 12. The material of the bimetallic strip 16 is, thus chosen independently of that of the bimetallic strip 12 and the same is true with regard to the thicknesses of the bimetallic strips 12, 16.

The characteristics of this bimetallic strip 16 are chosen so that it is triggered after the normal heating time of the plug 30, for example, at the end of 30 seconds to one minute.

Thus the safety bimetallic strip 16 has a double function, namely a normal safety function and an additional function to avoid the oscillation of the blades of the connecting bimetallic strip and to be sparing of it to benefit its service life.

As is apparent from the evidence of the description and of the drawings, the masking socket 11 has a bottom which is adjacent and is connected electrically to the bottom of the lighter socket 6.

The bottoms may be in direct contact with one another, but of course as a variant an electrically conductive part may be placed between the assembled bottoms by means of the attachment device 14 of the connecting bimetallic strip 12.

For this purpose, this attachment device 14 passes through the bottoms of the lighter socket 6 and masking socket 11 with electrical insulation provided, and in the above-mentioned manner.

According to a characteristic, the illuminant ring 60 surrounds the masking socket 11 and has at least one resiliently deformable attachment lug capable of coming into contact (bearing) with the rear face of the fixed wall 50 having an opening 51 traversed by the ring 60 and the sockets 6, 11. The ring 60 is in intimate contact with the masking socket 11.

Attachment 21 is between the masking socket 11 and the illuminant ring 60 for the attachment of the masking socket 11 in the illuminant ring 60.

At its open free end the lighting socket 6 has a generally transversely oriented frontal edge 62. This edge 62, in the form of a collar, is in contact with the front face of the end ring 61 of the illuminant ring 60. The dorsal or rear face of this ring 61 is in contact (bearing) with the front wall of the fixed wall 50.

The illuminant ring 60 bears a lighting source 26. This ring 60 is, in a manner known per se, made of translucent, even transparent, plastic material and comprises two diametrally opposite and semi-punched attachment lugs 23 produced by moulding.

These lugs 23 are axially oriented and have a triangular wedge shape, the inclined front face of which is able to come into engagement with the rear face of the fixed wall 50. These lugs 23 are therefore resiliently deformable and, after assembly, the fixed wall 50 is sandwiched between the ring 61 of the ring 60 and the inclined front faces of the wedges of the lugs 23, thus allowing the clearances to be taken up.

The means 21 are installed at the level of the rear end of the illuminant ring 60 (axially beyond the lugs 23 in the direction of the bimetallic strip 12) and consist of catches produced by moulding from the cylindrical wall 63 of the illuminant ring 60 and each penetrate into an associated opening made in the wall of the masking socket 11. These catches, which protrude internally with respect to the wall 63 of the ring 60, have an inclined face connected to a generally transversely oriented face forming a shoulder.

Two caches of attachment 21 and two associated openings are provided, whilst being diametrally opposite.

Moreover, the masking socket 11 has, by cutting and bending, at least two lugs, diametrally opposite, coming into contact with the wall of the lighter socket 6. These lugs 22 are installed axially between the open end of the masking socket 11 and the attachment 21 to accommodate them and also the ring 60.

Thus centering device acting between the masking socket 11 and the lighter socket 6 are created.

Thanks to this arrangement, a precise space is provided between the wall of the sockets 6 and 11, with the centering device being installed in the vicinity of the lugs 23, i.e. in the vicinity of the open end of the masking socket 11.

Initially the lugs 23 protrude inside the ring 60 previously mounted in the opening 51 of the fixed wall 50. It will be noted that the inclined rear face of the wedges of the lugs 23 is longer than the inclined front locking face of the wedges, so that the sliding of the ring 60 into the opening 51 is easy, with the lugs 23 being retracted inwardly during this sliding operation.

Thus a unitary captive assembly can be created, which comprises the sockets 6, 11 with the various components of the cigar lighter, especially the bimetallic strips and the blades 17, 19, then this assembly can be slid inside the illuminant ring 60, the lugs 23 of which are automatically raised and locked on contact of the rear face of the fixed wall 50 during this sliding operation; the catches of the attachment 21 penetrate into the associated openings of the masking socket 11.

As will have been understood, the lighter body can be mounted by the front face of the fixed wall through the opening 51.

Afterwards the lighting source 26 is mounted though the rear. More precisely the lighting source 26, here a bulb, is mounted inside an opaque housing 20 slid in the manner of a drawer onto axially oriented lugs 29 forming a slide, the lugs 29 being produced by moulding with the rear heel-shaped end of the illuminant ring 60.

It will be noted that the bulb 26 has a terminal connected to a power supply blade 24 able to be connected to the positive terminal of the battery. The blade 25 extends axially parallel to the blade 19.

The housing 20 bears an elastically deformable curved blade 25 capable of coming into contact with the rear end of the masking socket and with the base of the lamp 26.

It will be noted, after mounting (FIG. 2), that the free (or front) end of the masking socket 11 is engaged in centered manner (in intimate contact) in the ring 61. This free end is thus axially displaced towards the bottom of the lighter socket 6 in relation to the collar 62, which as a variant may consist of a rolled edge as disclosed in the above-mentioned document U.S. Pat. No. 2,701,297.

Good ventilation can be obtained in this manner between the sockets 6, 11.

Moreover angular indexing and guide devices act between the illuminant ring 60 and the second insulating part 18. These devices comprise at least one projection 64, 65 borne by the outer periphery of the washer 18 capable of being engaged in an axially sliding manner in an associated complementary axial groove which the cylindrical wall 63 of the ring 60 internally has.

Two diametrally opposite projections 64, 65 (FIG. 3) are provided at the inner periphery of the washer 18, so that the risks of wedging are minimised. These projections 64, 65 have different widths for the formation of a polarizing slot.

The projections 64, 65 are divided into pairs of transversal lugs 64, 65 engaged in corresponding axial grooves (not referenced) of the ring 60.

Of course the grooves are advantageously displaced in relation to the catches of the attachment 21.

Thus the washer 18 is simply slipped into the grooves so that the catches of the attachment 21 automatically come into engagement with their associated openings.

For this purpose it is advantageous for the washer 15 to have a point in the manner described above, as this allows the socket 11 to be indexed in relation to the socket 6.

The ring 60 advantageously has a projection 38, which here is divided into two axial lugs, able to engage in a corresponding notch having a U-shaped section with a flat base (visible in broken lines on FIG. 3) made in the edge of the opening 51 of the wall 50.

As a variant, the notch may be delimited centrally by a lug engaging between the axial lugs of the projection 38.

Thus the illuminant ring is initially prepositioned and will not rotate during the sliding of the assembly comprising the masking socket and the lighter socket, the projection 38 coming from the rear face of the multi-function ring 61.

It will be appreciated that the lugs 23 are flexible by virtue of their great axial length.

The openings of the attachment means are advantageously oblong.

Of course as described in document FR-A-2 436 930 the lugs 23 may extend transversally and the housing 20 may be in a single piece with the illuminant ring 3.

In this case an opening has to be provided in the wall 50 for the passage of the housing 20.

It will be appreciated that use is made of the illuminant ring 60 and that the lighter socket 6 with its blades 17, 19 is of the standard type.

The cigar lighter according to the invention is easy to mount and is very safe by virtue of the safety device 16 and the additional blade 13.

Of course the present invention is not restricted to the described exemplified embodiment.

In particular the number of lugs 22 and the number of lugs 23 may be greater than two, depending on the applications.

It is possible to invert the structures. Thus the attachment means may comprise lugs originating from the masking socket 11 and penetrating into associated recesses made in the illuminant ring 21.

Similarly the centring lugs 22 may originate from the lighter socket 6. The bimetallic strips 12 and 16 may be made of the same material and have the same thickness or a different thickness according to the applications. The centring nose may be borne by the washer 18 and penetrate into an associated hollow of the first insulating part 15.

The attachment 21 may be of the bayonet type especially when the lugs extend transversally, for example points of the masking socket being then engaged in bayonet grooves of the illuminant ring 60.

Of course the presence of the masking socket is not indispensable, as the lighter socket can be assembled with the illuminant ring as described in document FR-A-2 436 939. As a variant, the presence of the illuminant ring is not mandatory and a single safety blade, and a single part 37 may be provided.

I claim:

1. A lighter body for a cigar lighter for a motor vehicle comprising an electrical conductive lighter with a bottom, a connecting bimetallic strip attached to said lighter bottom via an electrically conductive attachment device, and a first electrically insulating part disposed between said connecting bimetallic strip and said lighter bottom;

said connecting bimetallic strip comprising a base and a plurality of axially oriented blades originating from said base and directed towards an open end of the lighter socket;

a first power supply part connected electrically to the connecting bimetallic strip by the electrically conductive attachment device;

a second power supply part connected electrically to the lighter socket and adjacent to the bottom of said lighter socket; and a safety element having a first generally axially oriented safety blade passing through the bottom of the lighter socket for contacting a contact part disposed on the second power supply part, the first safety blade being separate from the connecting bimetallic strip and attached to the base of said connecting bimetallic strip, the first safety blade having a free end for cooperating with a convex contact part disposed on the second power supply part such that said first safety blade is devoid of a contact stud.

2. A lighter body according to claim 1, wherein the safety blade comprises a safety bimetallic strip comprising two axially oriented safety blades, said safety bimetallic strip mounted head to tail in relation to the connecting bimetallic strip, and wherein each safety blade is adapted to cooperate with a convex contact part disposed on the second power supply part.

3. A lighter body according to claim 2, wherein the second power supply part comprises a generally axially oriented and right-angled blade with a base parallel to the bottom of the lighter socket for attaching said blade to said socket, wherein said contact parts originate from the base of said blade and extend axially outwardly such that the attachment end of said power supply blade has a U-shaped section including two arms forming said contact parts.

4. A lighter body according to claim 2, wherein the blades of the bimetallic safety strip have free ends, said free ends have a generally V-shaped section for localized contact with the convex parts of the second power supply part.

5. A lighter body for a cigar lighter for a motor vehicle comprising an electrical conductive lighter with a bottom, a connecting bimetallic strip attached to said lighter socket bottom via an electrically conductive attachment device, and a first electrically insulating part disposed between said connecting bimetallic strip and said lighter bottom;

said connecting bimetallic strip comprising a base and a plurality of axially oriented blades originating from said base and directed towards an open end of the lighter socket;

a first power supply part connected electrically to the connecting bimetallic strip by the electrically conductive attachment device;

a second power supply part connected electrically to the lighter socket and adjacent to the bottom of said lighter socket; and a safety element having a first generally axially oriented safety blade passing through the bottom of the lighter socket for contacting a contact part disposed on the second power supply part, the first safety blade being separate from the connecting bimetallic strip and attached to the base of said connecting bimetallic strip, the first safety blade having a free end for cooperating with a convex contact part disposed on the second power supply part such that said first safety blade is devoid of a contact stud;

wherein the safety element comprises a safety bimetallic strip comprising two axially oriented safety blades including the first safety blade, said safety bimetallic strip mounted head to tail in relation to the connecting bimetallic strip, wherein each of said safety blades is adapted to cooperate with each of a plurality of convex contact parts disposed on the second power supply part; and wherein a second insulation part has two lateral through-openings for, firstly mounting the two convex parts of the second power supply part and, secondly, mounting a housing enclosing at a distance a moveable part of the blades of the safety bimetallic strip.

6. A lighter body according to claim 5, wherein each lateral through-opening has an axially oriented upper edge having a first chamfered end and a second chamfered end, two parallel lateral edges disposed perpendicularly to the upper edge, and an axially oriented, arc-shaped lower edge for supporting the convex contact parts of the second power supply part.

7. A lighter body according to claim 6, wherein the lower edge is delimited laterally by two grooves contacting the lateral edges for mounting the convex contact parts of the second power supply part.

8. A lighter body according to claim 1, wherein a second electrically conductive contact part is disposed between a head of the attachment device and the base of the connection bimetallic strip, and wherein said second contact part is an axially oriented blade cooperation with a heating plug of the lighter body.

* * * * *